United States Patent [19]

Cawthron et al.

[11] Patent Number: 4,961,605
[45] Date of Patent: Oct. 9, 1990

[54] EXTENDABLE PROTECTIVE TRIM

[75] Inventors: Derrick Cawthron, Ft. Worth; Robert L. Woods, Arlington; James B. Story, Denton; Carl S. Lammons, Arlington; Donald W. Murray, Ft. Worth, all of Tex.

[73] Assignee: Body Guard, Inc., Dallas, Tex.

[21] Appl. No.: 245,912

[22] Filed: Sep. 19, 1988

Related U.S. Application Data

[63] Continuation-in-part of Ser. No. 55,328, May 29, 1987, abandoned.

[51] Int. Cl.⁵ .................. B02R 19/20; B02R 19/42
[52] U.S. Cl. .................................................. 293/128
[58] Field of Search ............... 293/102, 107, 118, 119, 293/126, 128

[56] References Cited

U.S. PATENT DOCUMENTS

| | | |
|---|---|---|
| 626,480 | 6/1899 | Bemelmans . |
| 1,504,679 | 8/1924 | Dietz . |
| 1,646,055 | 10/1927 | Ebaugh . |
| 1,664,342 | 3/1928 | April . |
| 2,116,604 | 5/1938 | Karl . |
| 2,146,090 | 2/1939 | O'Rourke . |
| 2,216,367 | 10/1940 | Hoblick . |
| 2,628,118 | 2/1953 | Gunnels, Jr. . |
| 2,984,512 | 5/1961 | Shaginaw . |
| 3,116,519 | 1/1964 | Keith . |
| 3,280,510 | 10/1966 | Vaux . |
| 3,380,193 | 4/1968 | Hill . |
| 3,473,264 | 10/1969 | Holka . |
| 3,576,338 | 4/1971 | Horton . |
| 3,596,962 | 8/1971 | Hertzell .................. 293/128 |
| 3,689,054 | 9/1972 | Gouirand ................ 293/107 X |
| 3,738,695 | 6/1973 | McBee . |
| 3,841,683 | 10/1974 | Toro ........................ 293/107 |
| 4,127,294 | 11/1978 | Cooper . |
| 4,221,412 | 9/1980 | Miller ...................... 293/118 |
| 4,273,369 | 6/1981 | Rosenbaum . |
| 4,291,818 | 9/1981 | Nozawa et al. . |
| 4,411,462 | 10/1983 | Buehrig et al. ......... 293/132 |
| 4,441,751 | 4/1984 | Wesley .................... 296/1 S |
| 4,518,183 | 5/1985 | Lee ......................... 293/118 |
| 4,666,196 | 5/1987 | McCoy et al. . |
| 4,815,777 | 3/1989 | Campbell ................ 293/107 |

FOREIGN PATENT DOCUMENTS

| | | |
|---|---|---|
| 572071 | 10/1923 | France . |
| 1211039 | 3/1960 | France . |

Primary Examiner—Russell D. Stormer

[57] ABSTRACT

A protective trim system is provided which protects the surface of an underlying solid body. The system includes an elongated trim member which is attached to a surface and is movable away from the surface to protect the underlying body.

17 Claims, 12 Drawing Sheets

FIG. 1A
(CLOSED POSITION)

FIG. 1B
(OPEN POSITION)

FIG. 2A
(CLOSED POSITION)

FIG. 2B
(OPEN POSITION)

FIG. 3A
(CLOSED POSITION)

FIG. 3B
(OPEN POSITION)

FIG. 4A (CLOSED POSITION)

FIG. 4B (OPEN POSITION)

FIG. 5A
(CLOSED POSITION)

FIG. 5B
(OPEN POSITION)

FIG. 6A (CLOSED POSITION)

FIG. 6B (OPEN POSITION)

FIG. 7A
(CLOSED POSITION)

FIG. 7B
(OPEN POSITION)

FIG. 8A (CLOSED POSITION)

FIG. 8B (OPEN POSITION)

FIG. 9A & B
(CLOSED POSITION)

FIG. 10

FIG. 11
(OPEN POSITION)

FIG. 12
(CLOSED POSITION)

FIG. 13

(CLOSED POSITION)

FIG. 14

(OPEN POSITION)

EXTENDABLE PROTECTIVE TRIM

RELATED APPLICATIONS

This application is a Continuation-in-Part of U.S. patent application Ser. No. 055,328, filed May 29, 1987 now abandoned.

BACKGROUND OF THE INVENTION

1. Field of the Invention

This invention relates generally to devices and methods for protecting automobile surfaces.

2. Background and Objects of the Invention

The problem of protecting the outer surface of an automobile from inadvertent impact from swinging doors and the like is not new. U.S. Pat. No. 3,738,695 issued to McBee, for example, shows a bumper for use on the side of an automobile. The protection device shown by this patent is designed to be attached to a window channel, roof trim or top of an opened window. A collapsible car body guard member is suspended from the position where it has been secured to protect the body of the automobile from opened car doors. The problem with this type of device is readily apparent. This protective bumper requires that the user physically place it on his car every time he uses it and storage of this device within the car is necessary.

There are a number of other patents which also recognize that automobiles are prone to damage when the door of an adjacent automobile is opened. These patents focus on protecting the door of the adjacent automobile by placing a protection device on the door which is opened. For example a retractable door bumper is shown in U.S. Pat. No. 3,280,510 which utilizes a mechanical assembly to extend a marproof bumper upon opening a door.

U.S. Pat. No. 3,380,193 shows a retractable protector for an automobile door. This device extends beyond the normal contour of an automobile door when the automobile door is opened, to protect adjacent cars. This device is retracted when the door is closed and therefore cannot be used to protect the door from adjacent cars.

Similarly, U.S. Pat. No. 3,473,264 shows a door edge guard which is activated upon opening a door; a plunger is used to activate the door protection guard when the door is opened.

U.S. Pat. No. 3,576,338 is an edge guard mechanism for the edge of a vehicle door. This device is connected to the latching mechanism of an automobile and is intended to extend upon opening the door. Although this door edge guard forms a part of the trim of an automobile, it does not protect the length of the door from adjacent automobiles hitting against the door. In fact, when a car having the device taught by this patent is parked with the door closed it is not protected from adjacent cars.

It is well known to put trim on a car for both decoration and protection from contact with adjacent objects. The protection afforded by conventional trim is limited to the thickness of the actual trim. Considering the irregularities of the contours of doors, a misalignment of the trim on a subject door with the edge of an adjacent door will not provide protection if the trim does not extend beyond a necessary limit. Since conventional trim must have an aesthetic component as well as a protective component, it is desired that trim for a car door not be thick or bulky. It can be appreciated therefore that there is a often a compromise between aesthetic appeal of the trim and its functional utility as a protective device.

U.S. Pat. No. 4,666,196 teaches a device for protecting the side of an automobile. This device requires manually extending a device away from the surface to be protected.

It is therefore the object of the invention to provide a decorative trim which can serve the purpose of protecting the side of an automobile.

Another object of the invention is to provide a trim for an automobile which is movable independently from the movement of the object it is intended to protect.

SUMMARY OF THE INVENTION

To achieve the foregoing and other objects, and in accordance with the purposes of the present invention, as embodied and broadly described herein, the protective trim system for protecting the surface of an underlying solid body includes an elongated trim member. This trim member is attached to the surface of the underlying solid body which is to be protected. Further included in the system is a mechanism for selectively extending or retracting a portion of the elongated trim member away from or toward the surface to be protected. The movement of the trim member is independent of any movement of the underlying solid body.

In a further aspect of the invention a mounting flange is provided which is used for attaching the trim to the surface of the body. The mounting flange and the elongated trim member can be connected by a number of different mechanisms. These mechanisms can allow rotation of the elongated trim relative to the mounting flange or can allow the trim to extend along a line perpendicular to the mounting flange. Among the mechanisms used for attaching the trim to the mounting flange are: a mechanical hinge, a ball and socket hinge, a flexible ball and socket, a thin walled flexible hinge, and rotary bellows. The protective trim can extend using a number of other mechanisms including an extendable bellows, balloon bellows, or a translational hinge. In a further aspect of the invention extendable bellows, rotary bellows, or balloon bellows are extended or retracted by the use of a pneumatic actuator.

In yet a further aspect of the invention a method is provided for protecting an object from contact by a second object. This method includes first affixing a trim to the object to be protected. The second step is to extend the trim away from the object to be protected without the necessity of moving the object. The foregoing method may be used to protect a section of an automobile and the trim may be affixed to the object by a mounting flange.

In another aspect of the invention a protective trim system is provided which protects a vehicle body part. The system has an elongated trim member having substantially the same length as the body part to be protected. The trim is attached to the surface of the vehicle body part and has a mechanism for selectively extending or retracting a portion of the elongated trim member away from or toward the vehicle body part surface. A number of vehicle body parts can be protective including a door, a quarter panel, a trunk, or a fender.

An advantage of this invention is that designers of automobile molding need not sacrifice aesthetics for protection of the surface of an automobile.

Another advantage of the invention is that the trim can be selectively retracted or extended in accordance with the desires of the user. The movement of the trim need not be a function of opening a door.

A BRIEF DESCRIPTION OF THE DRAWINGS

The accompanying drawings, which are incorporated and form a part of the specification, illustrate the embodiments of the present invention and, together with the description, serve to explain the principles of the invention. The drawing:

FIG. 9B is a view of the balloon bellows used in FIG. 9A in an extended position.

DETAILED DESCRIPTION OF THE PREFERRED EMBODIMENTS

Figure 1A:
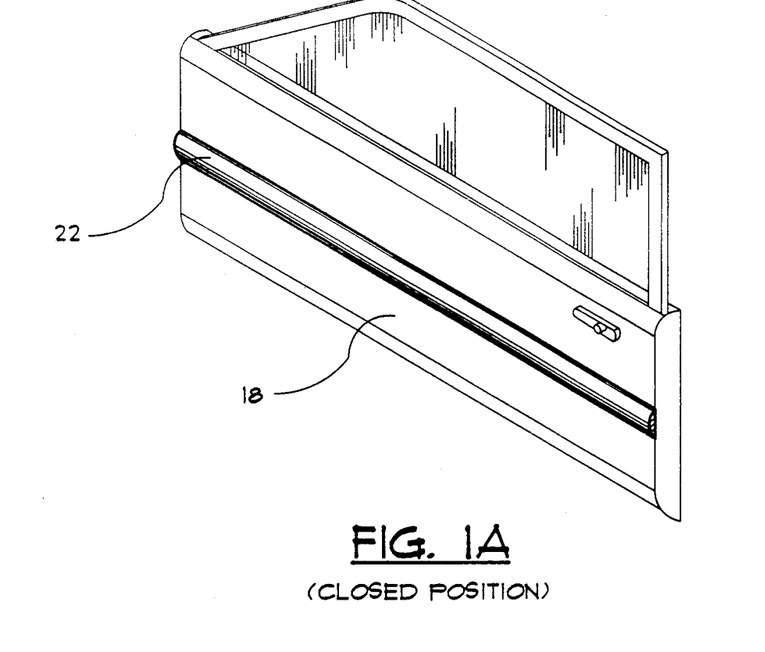
FIG. 1A is a perspective view of a retracted trim on an automobile door.
Figure 1B:
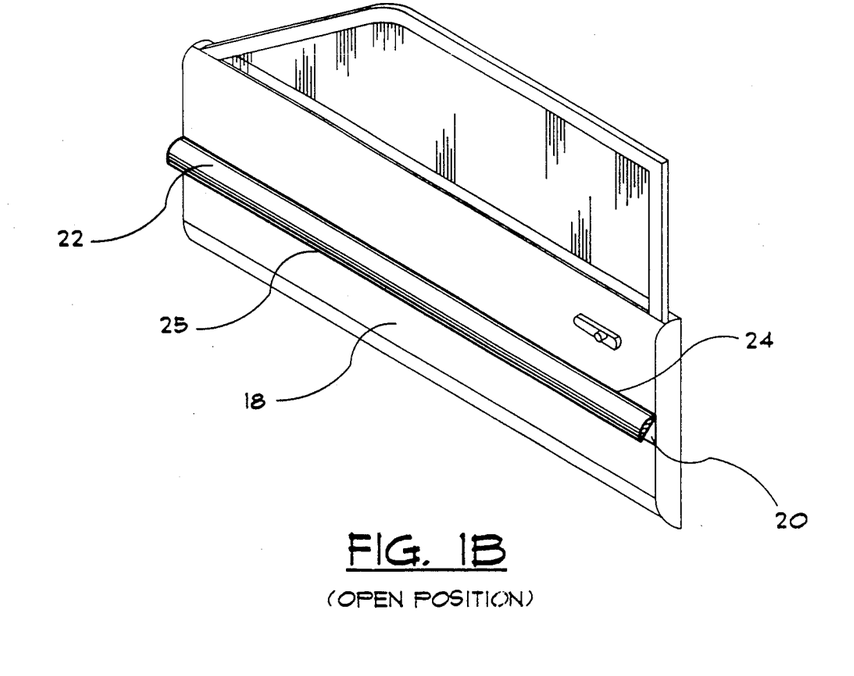
FIG. 1B is a perspective view of an elongated trim on an automobile door.

Referring to FIGS. 1A and 1B, there is shown an embodiment of the invention used with an automobile door 18. In this embodiment an elongated trim member 22 rotates relative to door 18. Although there are various mechanisms which may accomplish this end, and numerous ways of extending trim member 22 away from the door 18, FIG. 1 shows an embodiment whereby trimming member 22 rotates along surface 24. A mounting flange 20 is used to connect the elongated trim member 22 to automobile door 18. It is however anticipated that the elongated trim member 22 could be connected directly to the door 18 without the use of a mounting flange 20. It is also anticipated that elongated trim member 22 could rotate about the lower surface 25 of the trimming member 22.

Figure 2A:
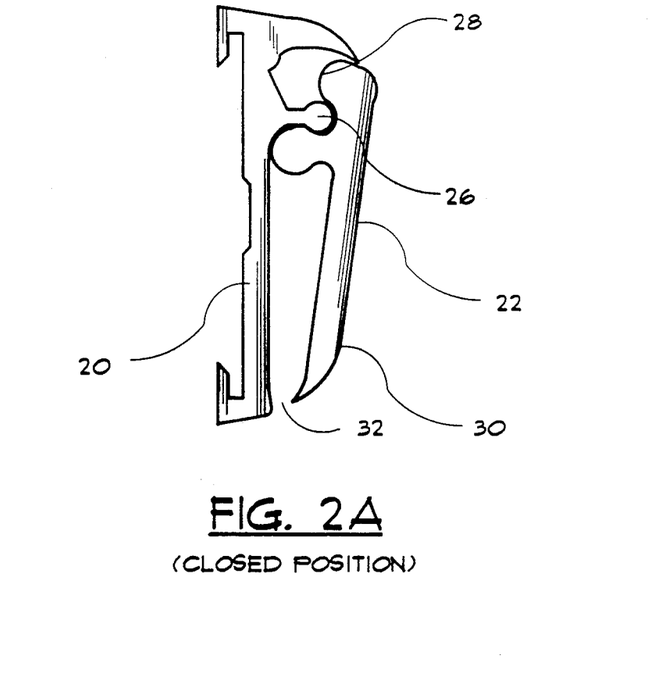
FIG. 2A is a schematic of a ball and socket hinge to connect the elongated trim member to a mounting flange, in a retracted position.
Figure 2B:
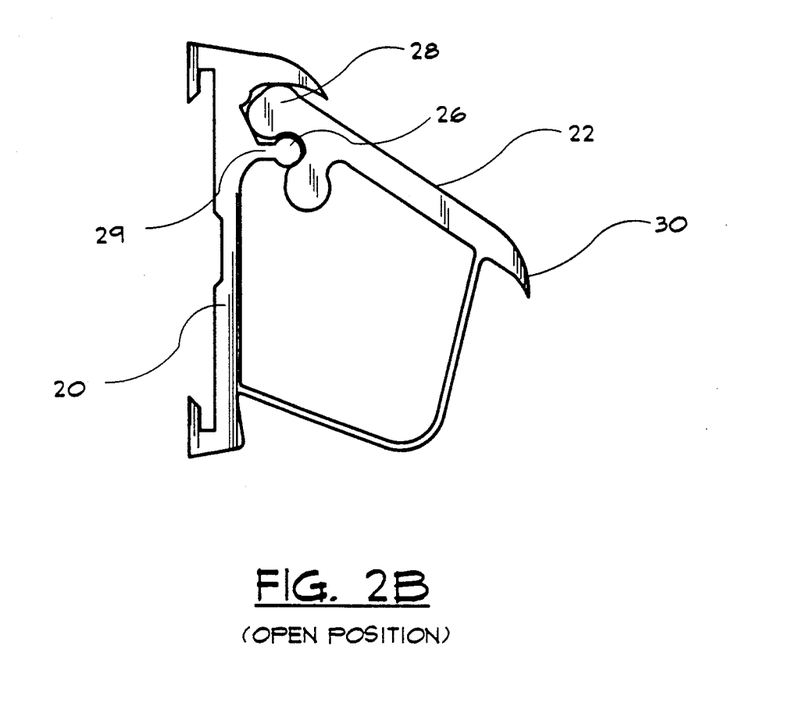
FIG. 2B is a view of the mounting flange and extending member of FIG. 2B, in an extended position.

Turning now to FIGS. 2A and 2B, a ball and socket hinge is used to connect the elongated trim 22 with the mounting flange 20. The top of the protective trim 22 defines an opening 28 which is sized to accommodate ball 26 extends from the mounting flange 20 and may be connected to the mounting flange with a clearance stem 29. In one embodiment of the invention, not shown, the ball in this type of hinge can extend directly from the protective trim and fit within an opening in the mounting flange. Although the embodiment of the invention shown in FIG. 2 shows a spacing between protective trim 22 and mounting flange 20, this space may be filled in any desired manner. In addition, the tapering 30 shown in FIGS. 2A and 2B is used primarily for decorative purposes.

The elongated protective trim 22 is extended from the retracted position of 2A to the extended position shown in 2B by means of any conventional device for moving one member relative to another.

Figure 3A:
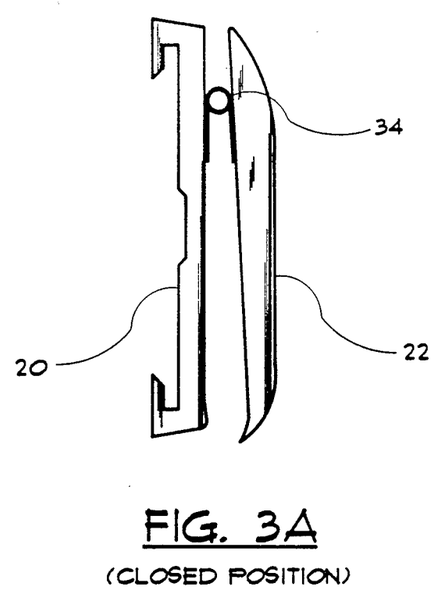
FIG. 3A is a schematic of a mechanical hinge used to connect the elongated trim member to a mounting flange, in a retracted position.
Figure 3B:
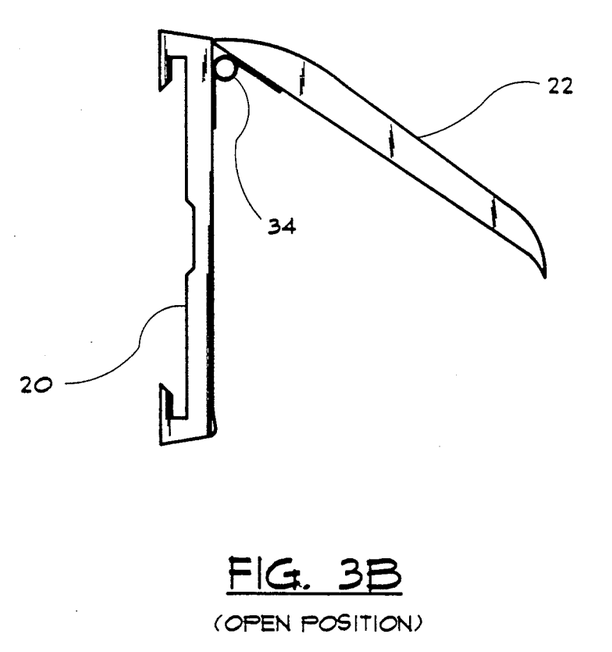
FIG. 3B is a view of the mounting flange and elongated trim member of 3B in an extended position.

FIGS. 3A and 3B is an embodiment of the invention which uses a mechanical hinge as the device for connecting the protective trim 22 to the mounting flange 20. Hinge 34 may be either a continuous hinge or may be a series of segmented hinges. The hinge 34 is connected to the trim 22 and the mounting flange 20 in any conventional manner, for example, the hinge 34 may be attached to these components using conventional screws or adhesive.

Figure 4A:
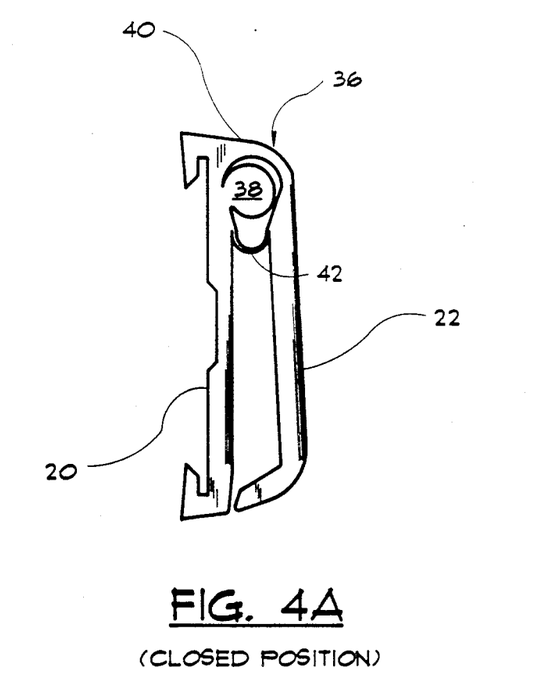
FIG. 4A is a schematic of a flexible ball and socket joint used to connect the elongated trim member to the mounting flange, in a retracted position.
Figure 4B:
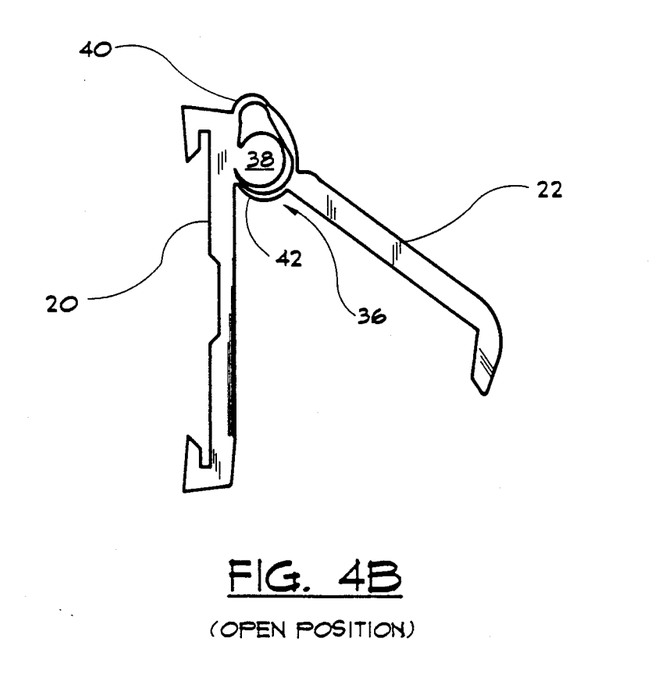
FIG. 4B is a view of the mounting flange and elongated trim member of 4A in an extended position.

FIGS. 4A and 4B is another embodiment of the invention whereby the elongated trim member 22 rotates relative to the mounting flange 20 by using a flexible ball and socket unit 36. In this embodiment a ball member 38 is attached to and extends from mounting flange 20. A first flexible socket member 40 extends around ball member 38, and interconnects elongated trim 22 and mounting flange 20. The flexible socket member 40 extends around the top portion of ball 38 as shown in FIGS. 4A and 4B. When elongated trim member 22 is in a retracted position as shown in FIG. 2A, the first flexible socket member 40 follows the curve of ball member 38 and is substantially extended. Although FIG. 4A does not show the first flexible socket member 40 in contact with ball member 38, these components may actually be in contact when the system is in a retracted orientation. A second flexible socket member 42 also interconnects the elongated trim member 22 and the mounting flange 20, extending in a direction around the ball member 38 which is opposite the direction which the first flexible socket member 40 extends around the ball member 38. The second flexible socket member is under tension when the protective trim system is extended. The flexible ball and socket configuration of FIGS. 4A and 4B may be a single monolithic member made in any conventional manner or may be a conglomeration of individual components. Naturally the material used to make the first flexible socket member 40 and the second flexible socket member 42 must be able to withstand a number of tension/compression cycles without undergoing serious fatigue. Any conventional material, for example an elastomeric material, may be used to accomplish this end.

Figure 5A:
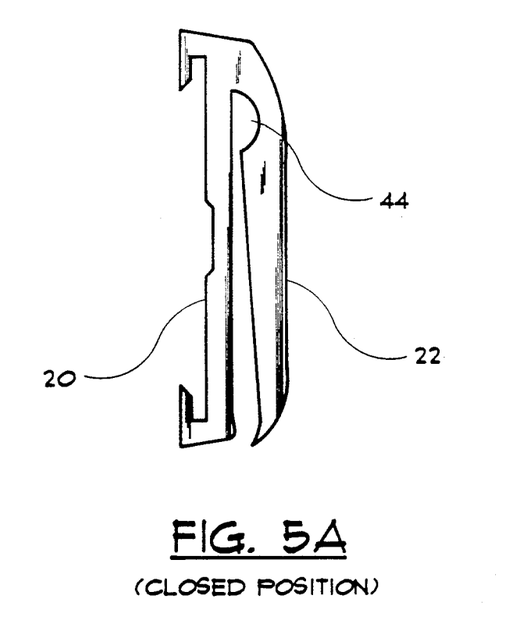
FIG. 5 is a schematic of a thin-wall flexible hinge used to connect the elongated trim member to the mounting flange, in a retracted position.
Figure 5B:
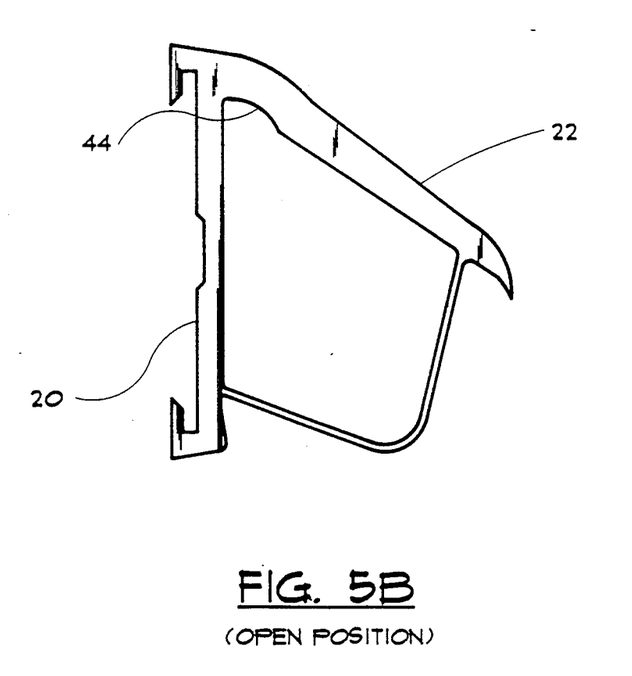
FIG. 5B is a view of the mounting flange and elongated trim member of FIG. 5B in an extended position.

FIGS. 5A and 5B show an embodiment of the invention which utilizes a thin wall flexible hinge to allow rotation of the elongated trim member 22 relative to the mounting flange 20. In this embodiment of the invention the mounting flange 20 and the elongated trim 22 form a single monolithic member. Notch 44 is formed at a desired point of rotation to allow the extension of the trim member 22. This embodiment, as with some of the other embodiments of this invention, require that a material be used which can undergo numerous retraction and extension cycles. Many conventional elastomeric materials fulfill the requirements of this embodiment.

Figure 6A:
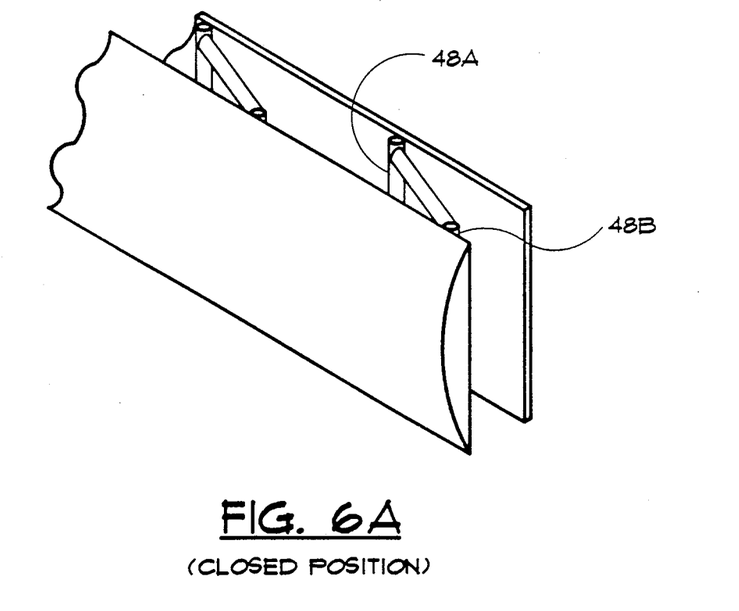
FIG. 6 is a perspective schematic of a translational hinge used to connect the elongated trim member to the mounting flange, in a retracted position.
Figure 6B:
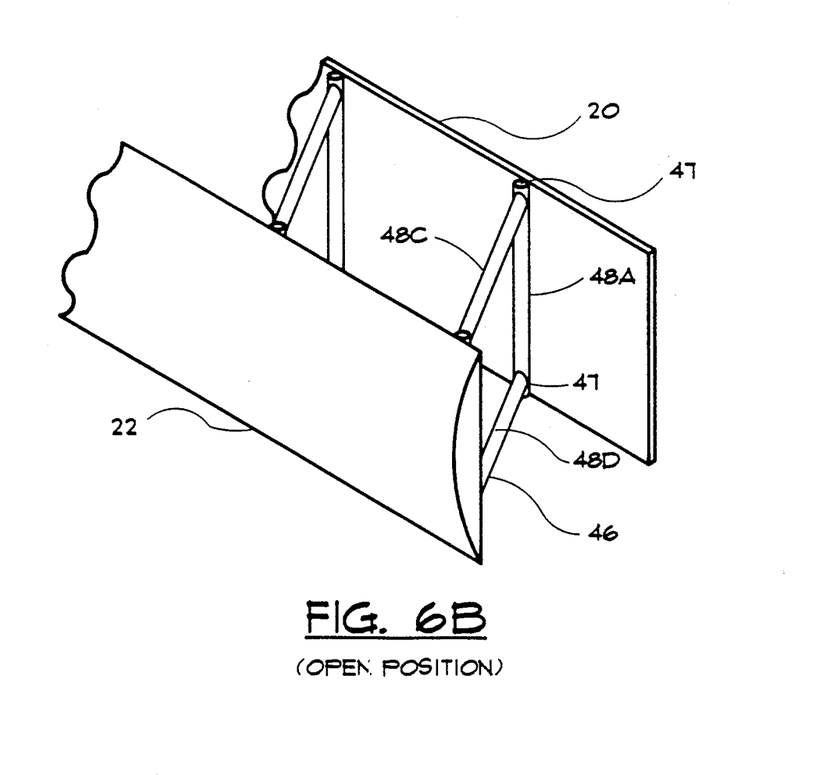
FIG. 6B is a view of the mounting flange and elongated trim member of FIG. 6A in an extended position.

FIGS. 6A and 6B are a perspective view of a transitional hinge used as a component of the invention. In this embodiment, parallel translational hinges 46 are connected to mounting flange 20 and the protective trim 22. When extended, the exterior protective trim moves in a translational motion. This translation positions the trim at a distance from the protected surface so that adjacent objects which are moving toward the body will contact the elongated trim 22 before contacting the surface to be protected. Any conventional translational hinge can be used in this embodiment of the invention, for example, a first framing member 48A may be attached to the surface of the mounting flange 20, a second framing member 48B may be connected to the elongated trim 22, and third and fourth framing members 48C and 48D may be used to connect 48A to framing member 48B, whereby framing members 48A, 48B, 48C, and 48D form a parallelogram. At the corners of this parallelogram are hinge joints 47 which may be any conventional device for allowing translation of the framing members as shown in FIGS. 6A and 6B. For example, the junction of the framing members may be a hinge joint 48 which comprises a ball joint.

Figure 7A:
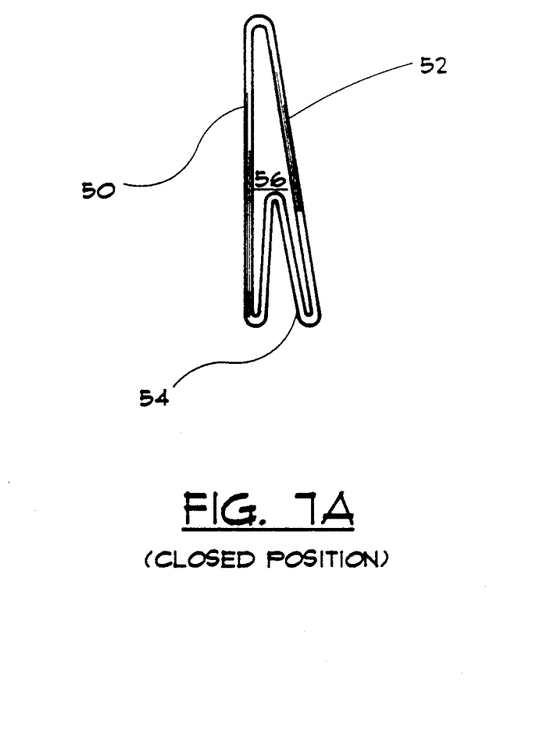
FIG. 7A is a schematic of a rotary bellows embodiment of the invention in a retracted position.
Figure 7B:
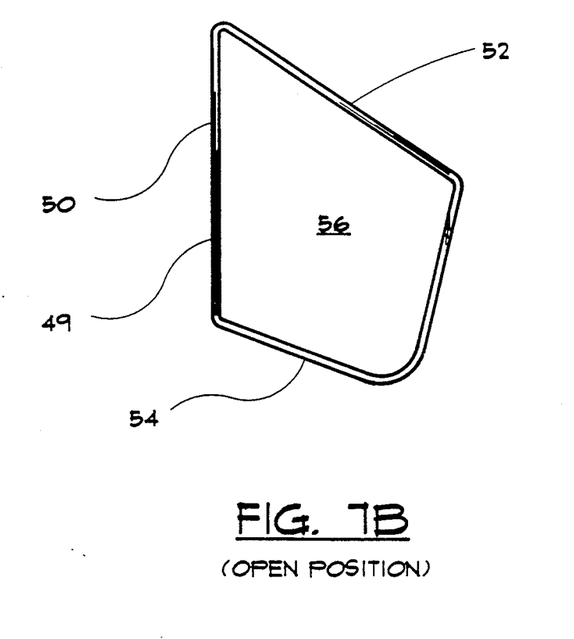
FIG. 7B is a view of the rotary bellows embodiment shown in FIG. 7A in an extended position.

A rotary bellows 49 may be used to practice the invention as shown in FIGS. 7A and 7B of the accompanying drawings. In this embodiment of the invention, an exterior trim edge 52 is used which is the equivalent to the elongated trim member of the embodiments of FIGS. 1 through 6 and FIG. 8. When using a rotary bellow 49 to practice the invention the exterior trim edge 52 is used to form one edge of an extended bellows. A bending leg 54 of the rotary bellow 49 forms another leg of the rotary bellows and is bent when the trimming system is in a retracted orientation, as shown in FIG. 7A and it may be extended as shown in FIG. 7B, to protect a body. A third leg of the bellows 50 also acts as the mounting edge to mount the rotary bellows to the side of a body to be protected. This embodiment of the invention may use either pneumatic or mechanical means to extend and retract the exterior trim edge.

Figure 10:
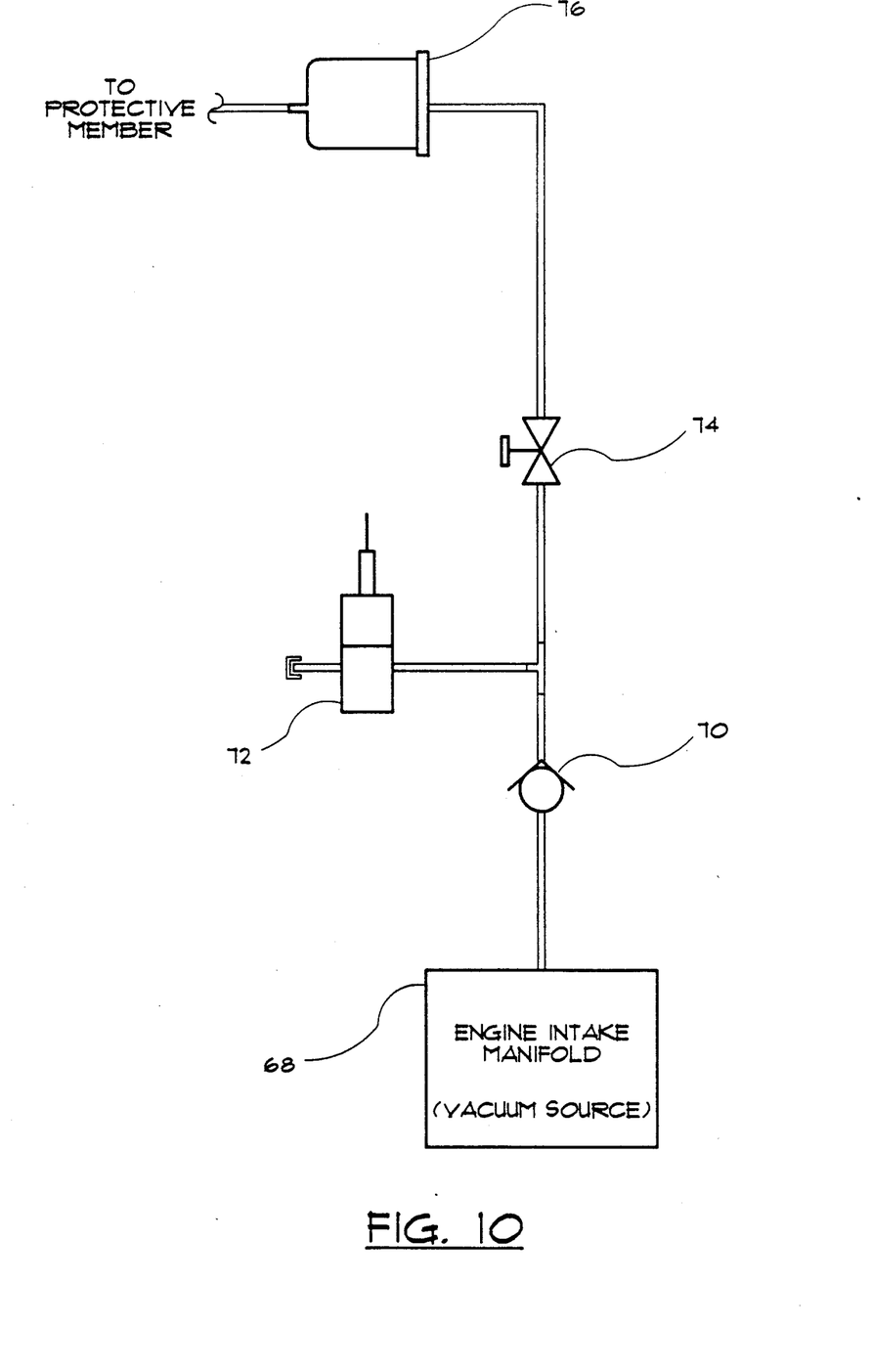
FIG. 10 is a schematic of a pneumatic control mechanism used to practice the invention.

In one embodiment of the invention, the bellows is extruded or molded in the normally extended position and a vacuum source is applied to interior 56 to retract the protective member; however, the bellows could also be formed in a normally retracted position with positive pressure being used to extend the bellows. FIG. 10 shows a schematic of an activation means used when the rotary bellows 49 is extended or retracted using pneumatic means. This figure will be discussed in more detail below.

Figure 8A:
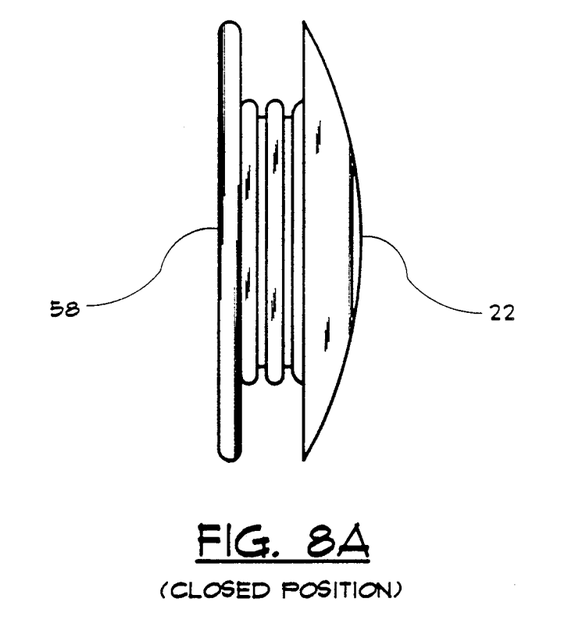
FIG. 8A is a schematic of a extendable bellows to connect the elongated trim member to the mounting flange, in a retracted position.
Figure 8B:
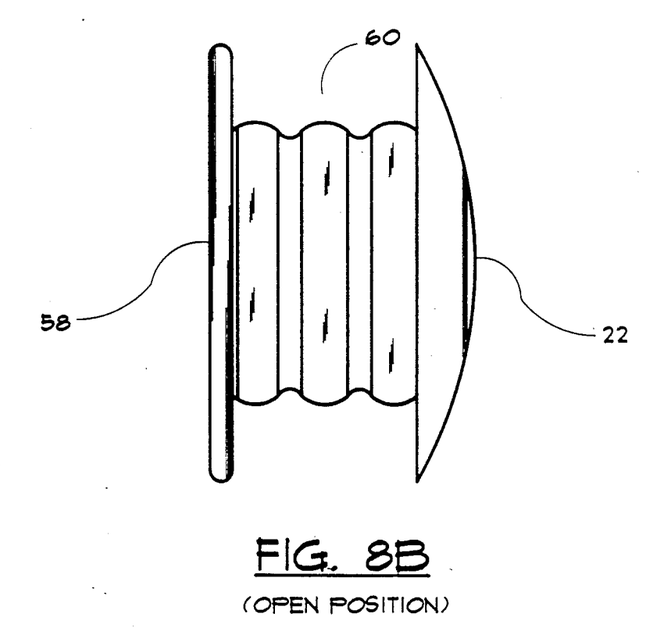
FIG. 8B is a view of the mounting flange and elongated trim member of FIG. 8B in an extended position.
Figure 9A:
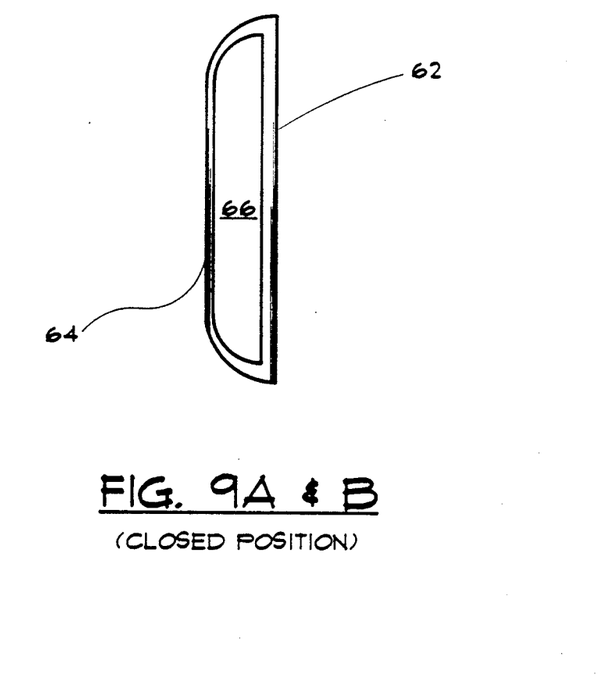
FIG. 9A is a cross-sectional schematic of an embodiment of the invention using balloon bellows, in a retracted position.

FIGS. 8A, 8B and 9A, 9B show two more embodiments of the invention in which an extendable bellows is used to practice the invention. In FIG. 8A a bellows 60 connects the trim member 22 with a mounting member 58. The bellows 60 has a spring stiffness associated with its motion and can be designed to operate with either positive pressure or a vacuum. Thus the spring can be designed so that the bellows 60 can be in the normally extended position with vacuum required to retract the protective member, or in the normally retracted position with pressure required to extend the elongated trim member 22. In a similar embodiment, shown in FIGS. 9A and 9B, a balloon bellow is used which has expandable member 64 which expands upon application of pressure or alternatively, is made to retract upon application of a vacuum within the interior 66 of the balloon bellows. Interior 66 is enclosed by expandable member 64 and the mounting edge 62.

Turning to the pneumatic activation schematic shown in FIG. 10, a vacuum source 68, such as an engine intake manifold, communicates with actuator 76. The actuator can be any of the pneumatic operated embodiments discussed previously; the actuator 76 may be a balloon bellows, an extendable bellows, or a rotary bellows. The vacuum source 68 communicates with the actuator 76 through a check valve 70 which allows flow of air in only one direction. This check valve 70 permits the vacuum to be applied to the actuator 76 and thereby causes the protective member to retract whenever the vacuum is applied. When the vacuum source 68 is the intake manifold of an automobile, the protective member is retracted whenever the engine is running. When the engine is not running the vacuum remains in the actuator 76 so that the protective member remains retracted unless triggered by a valve 72 which is connected in parallel to check valve 70. The valve 72, connected in parallel to the check valve 70, can be triggered by an electric signal which is controlled of the driver. For example, the switch can be activated by an electric car door locking device or may be connected to the ignition of an automobile. Valve 72 may be a mechanically activated valve or a solenoid activated valve as shown in FIG. 10. Alternatively, the valve 72 may be activated by a mechanical pushbutton under the control of the driver.

It should be noted that one way check valve 70 serves the purpose of holding a vacuum if the vacuum source 68 is for some reason inactivated. If for example the vacuum source 68 is the intake manifold of an automobile it is common for temporary breaks in the vacuum. The check valve enables these temporary breaks in the vacuum to take place without any effect on the movement of the actuator 76.

Figure 11:
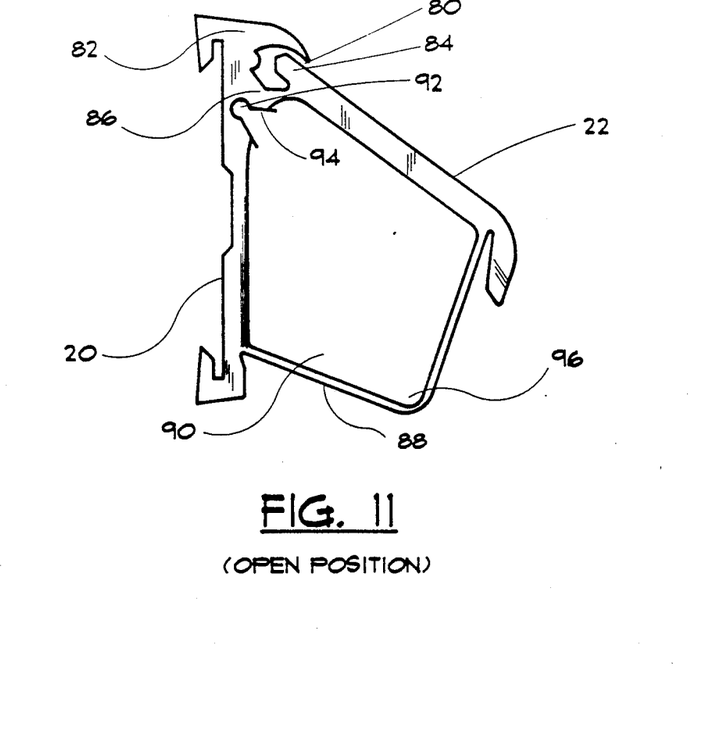
FIG. 11 is a cross-section schematic of one embodiment of the invention in which an inflatable bladder is used in a retracted position.
Figure 12:
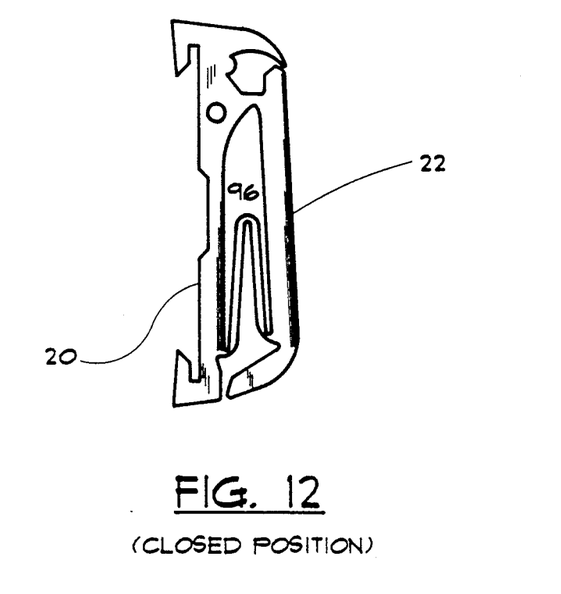
FIG. 12 is a view of the inflatable bladder embodiment of FIG. 11 in an extended position.

A lockout valve 74 can be employed in series with the one way check valve 70 and the parallel valve 72 to inhibit the activation of the protective member if the driver prefers to leave the protective trim in the retracted position FIGS. 11 and 12 show yet another embodiment of the invention in which a thin wall connects mounting flange 20 with trim member 22. In this embodiment of the invention mounting flange 20 and trim member 22 are formed from a single monolithic piece of material. The material may be any of a number of materials such as a rubber. In this embodiment the thin walled member is used in combination with a inflatable bladder. In a preferred embodiment of the invention the inflatable bladder is closed off at both ends and forms a interior space 90. In the embodiment of the invention shown in FIGS. 11 and 12 the mounting flange 20 and trim member 22 are connected by a thin wall 86. By orienting the proximate end 84 of trim member 22 such that it cooperates with a socket 82 in the mounting flange, a connection 80 is formed by which there is anaesthetic appeal whether the trim member is in an extended orientation as shown in FIG. 11 or the retracted orientation of FIG. 12. It should be noted that the precise device for connecting the mounting flange to the trim member may be modified significantly and still fall within the scope of the invention. Examples of some of the other possible connections have been previously described.

Formed in the inflatable bladder 88 is a tube 92. This tube is in communication with a vacuum line in the engine of an automobile. In addition, tube 92 is in communication with interior space 90 via small apertures 94 which are intermittently spaced along the length of tube 92. In operation, when the automobile engine is activated, a vacuum is formed which deflates the deflatable bladder. It should be noted that the bladder may be formed either from an elastic material or may be relatively inelastic. Deflating the bladder adder means that interior space 90 becomes smaller. This can occur because the vacuum causes the bladder to fold. For example, the bladder may fold at a point 96 as shown in FIGS. 11 and 12. This bladder is attached to the elongated trim and draws the trim inward to the position shown in FIG. 12. The figures are a schematic representation of one embodiment of the invention and as such do not show bladder 88 attached to elongated trim 22. However, it should be understood that the bladder may be attached to the elongated member by any conventional means. For example, it may be attached mechanically, attached by an adhesive, or be formed from a single monolithic piece of material.

While the engine of the automobile is running the trim remains as shown in FIG. 12. However, when the automobile engine is turned off, the vacuum is broken and the trim returns to its natural position as shown in FIG. 11. In this position the trim protects the accompanying automobile from damage due to impact of moving objects.

Figure 13:
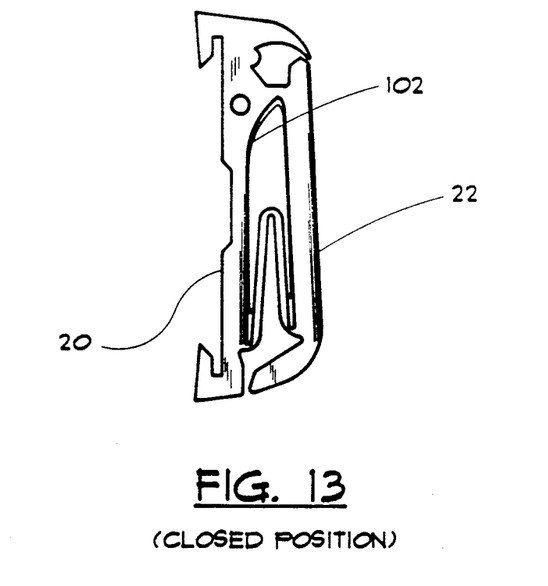
FIG. 13 is a showing of another embodiment of the invention in an extended position.
Figure 14:
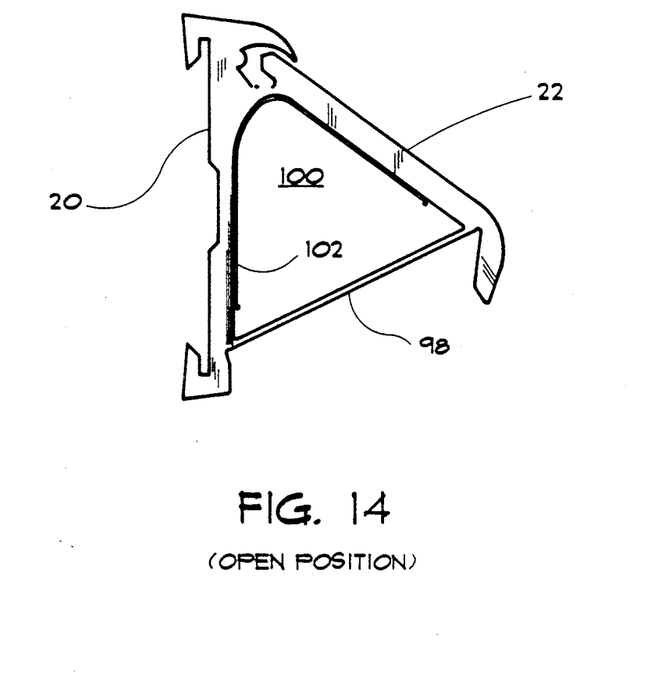
FIG. 14 is a view of the embodiment of FIG. 13 shown in a retracted position.

FIGS. 13 and 14 show yet another embodiment of the invention. This embodiment shows an extendable trim member which is a one-piece extrusion with a built-in bladder. The one-piece extrusion has an elongated trim 22, a mounting flange 20 and a bladder web or leg 98 which extends between said elongated trim and a mounting flange. The interior space 100 formed by the leg 98, the mounting flange 20 and the elongated trim 22 is evacuated upon application of a vacuum and the extendable trim goes from its natural position as shown in FIG. 14 to its retracted position as shown in FIG. 13. The vacuum, as previously described, may be formed by communication between a vacuum line in the engine of the automobile and the interior space 100.

A flat spring 102 may be placed within interior space 100 to help bias the elongated trim 22 in the position shown in FIG. 14.

In the embodiment of the invention shown in FIGS. 11-14, it is important that there is an interior space which maintains a vacuum. To ensure the maintenance of a vacuum, an end piece may be inserted at each end of the extendable trim member. These end pieces may be creased to fold inward as the extendable trim retracts. The end pieces may be made of the same material as the elongated trim 22 and may be attached within the openings formed at the ends of the bladder. The end pieces may be attached by adhesive or by welding techniques such as ultrasonic welding or simple melting and attaching the surfaces to be affixed.

There are a number of materials which can be used to make the bladder. For example, in the embodiment of the invention shown in FIGS. 13 and 14, an elastomeric polymer such as SANTOPRENE, marketed by Monsanto Chemical Corporation, St. Louis, Mo., can be used. This material has a long life cycle, has good temperature range usefulness (it functions well at both low and high temperatures), and it heat seals without losing elasticity or flexibility. A durometer hardness of about 87 may be used to practice the invention.

Naturally, there are many other suitable materials which may be used to practice the invention.

The foregoing description of the preferred embodiments of the invention have been presented for purposes of illustration and description. It is not intended to be exhaustive or to limit the invention to the precise form disclosed, and obviously many modifications and variations are possible in light of the above teachings. The embodiments were chosen and described in order to better explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A protective trim system for protecting a surface of an engine driven vehicle from impact damage when said vehicle is stationary, comprising:
   a mounting flange mounted on said surface to be protected;
   an elongated trim member pivotable between extended and retracted positions, said trim member protecting said surface from impact damage in said extended position, said trim member moving toward said extended position when said engine is de-activated; and
   means for providing a vacuum between said trim member and said mounting flange when said vehicle engine is activated, said vacuum means drawing said trim member from said extended position to said retracted position.

2. The protective trim system according to claim 1 further comprising a deflatable bladder disposed between said mounting flange and said trim member.

3. The protective trim system according to claim 2, wherein said deflatable bladder extends substantially the length of said trim member and said deflatable bladder defines an interior space.

4. The protective trim system according to claim 3, wherein said deflatable bladder comprises a tube which extends the length of said bladder and which is in communication with both said vacuum means and said interior space.

5. The protective trim system according to claim 4, wherein said vacuum means is a vacuum line in said vehicle engine.

6. The protective trim system according to claim 2 wherein said deflatable bladder is in communication with a vacuum line of said vehicle engine whereby upon activation of the engine, said bladder deflates and draws said trim member towards said mounting flange.

7. The protective trim system according to claim 1, wherein said mounting flange and said trim member are integral.

8. The protective trim system according to claim 1 wherein said elongated trim member and said mounting flange further comprise balloon bellows.

9. The protective trim system according to claim 1 wherein said mounting flange and said elongated trim member are connected by extendable bellows.

10. The protective trim system according to claim 1 wherein said mounting flange and said elongated trim member are connected by a translational hinge.

11. The protective trim system according to claim 1 further comprising spring means for biasing said elongated trim member away from said mounting flange and into said extended position.

12. The protective trim system according to claim 11 further comprising a deflatable bladder disposed between said mounting flange and said trim member.

13. The protective trim system according to claim 1 wherein said mounting flange and said elongated trim member are connected by means for allowing rotation of said elongated trim about an axis parallel to the longitudinal axis of the elongated trim member.

14. The protective trim system according to claim 13 wherein said means for allowing rotation comprises a mechanical hinge.

15. The protective trim system according to claim 13 wherein said means for allowing rotation comprises a ball and socket hinge.

16. The protective trim system according to claim 13 wherein said means for allowing rotation comprises a flexible ball and socket joint comprised of:
   a cylindrical member extending along said mounting flange in the longitudinal direction, said cylindrical member protruding from said mounting flange in a direction away from the surface to be protected;
   a first flexible socket member connecting one edge of said elongated trim member to said mounting flange, said first flexible socket member being substantially extended when said elongated trim member is in said retracted position; and
   a second flexible socket member connecting said elongated trim member to said mounting flange, said second flexible socket member extending around said cylindrical member in a direction opposite said first flexible socket member, said second flexible socket member being substantially extended when said elongated trim member is in said extended position.

17. The protective trim system according to claim 13 wherein said means for allowing rotation comprises a rotary bellow.

* * * * *